US007008159B2

(12) United States Patent
Dendo

(10) Patent No.: US 7,008,159 B2
(45) Date of Patent: Mar. 7, 2006

(54) SCREW GROMMET

(75) Inventor: Masashi Dendo, Ganagoori (JP)

(73) Assignee: Newfrey LLC., Newark, DE (US)

( * ) Notice: Subject to any disclaimer, the term of this patent is extended or adjusted under 35 U.S.C. 154(b) by 0 days.

(21) Appl. No.: 10/614,826

(22) Filed: Jul. 9, 2003

(65) Prior Publication Data

US 2004/0071527 A1 Apr. 15, 2004

(30) Foreign Application Priority Data

Jul. 10, 2002 (JP) ............................ 2002-200767

(51) Int. Cl.
*F16B 37/04* (2006.01)

(52) U.S. Cl. ....................... 411/182; 411/60.2; 411/508

(58) Field of Classification Search ................ 411/182, 411/508, 913, 57.1, 80.5, 60.2, 80.1
See application file for complete search history.

(56) References Cited

U.S. PATENT DOCUMENTS

| | | | | |
|---|---|---|---|---|
| 2,836,214 | A | 5/1958 | Rapata | 411/182 |
| 2,975,814 | A * | 3/1961 | Tinnerman | 411/182 |
| 3,701,302 | A * | 10/1972 | Pestka et al. | 411/15 |
| 3,756,116 | A * | 9/1973 | Schuplin | 411/15 |
| 4,077,300 | A | 3/1978 | Yoda | 85/80 |
| 4,293,260 | A * | 10/1981 | Kojima et al. | 411/44 |
| 4,971,500 | A | 11/1990 | Benoit et al. | 411/182 |
| 5,593,262 | A | 1/1997 | Gedeon et al. | 411/182 |
| 6,315,510 | B1 * | 11/2001 | Sturies et al. | 411/182 |

FOREIGN PATENT DOCUMENTS

| | | |
|---|---|---|
| GB | 2 069 089 | 8/1981 |
| JP | 49-25957 | 3/1974 |
| JP | 55-124618 | 9/1980 |
| JP | 7-10527 | 2/1995 |

* cited by examiner

*Primary Examiner*—Flemming Saether
(74) *Attorney, Agent, or Firm*—Miles & Stockbridge P.C.

(57) ABSTRACT

A screw grommet comprises a shank inserted into a mounting hole in a workpiece and a flange formed at one end of the shank that is larger than the mounting hole in the workpiece. A cavity is formed in the flange and the shank into which a tapping screw can be screwed after insertion through a hole in a member to be mounted on the workpiece. The shank has a rectangular cross-section appropriate for a rectangular cross-section mounting hole in the workpiece. Both the flange and a portion of the shank are divided by a plurality of axial slits. Protrusions are formed diagonally on the outer periphery of the shank separated axially from the flange by about the thickness of the workpiece. The screw grommet is able to obtain high retention force with respect to a workpiece without rotating together with a turned screw.

6 Claims, 5 Drawing Sheets

SCREW GROMMET

CROSS REFERENCE TO RELATED APPLICATION

This application claims the benefit of Japanese Application No. 2002-200767 filed Jul. 10, 2002, incorporated herein by reference.

BACKGROUND OF THE INVENTION

The present invention relates to a screw grommet suitable for mounting a member, such as a component or bracket, to a workpiece such as a body panel for an automobile and relates, more specifically, to a screw grommet comprising a shank inserted into a mounting hole in a workpiece and a flange formed at one end of the shank that is larger than the mounting hole in the workpiece, with a cavity formed in the flange and the shank into which a tapping screw can be screwed to join the member to the workpiece.

FIGS. 1 and 2 show a screw grommet 1 of the prior art. The screw grommet 1 is made of plastic, and consists of a shank 5 and a flange 6 formed at one end of the shank 5 that is wider than a mounting hole 3 in a workpiece 2. A cavity 9 is formed in the shank 5 and the flange 6 into which a tapping screw 7 can be screwed. The shank 5 is inserted into the mounting hole 3 in the workpiece 2, bringing the flange 6 into contact with the workpiece. A mounting hole 11 in a member 10, such as a component or bracket, is aligned with the cavity 9, and a tapping screw 7 is screwed into the cavity 9 to join the member 10 to the workpiece 2. This type of screw grommet 1 is intended to attach the member 10 securely even when the workpiece 2 is a thin panel.

In the screw grommet 1 of the prior art shown in FIGS. 1 and 2, rectangular cross-sections of the mounting hole 3 in the workpiece 2 and the shank 5 are intended to prevent the screw grommet 1 from rotating with the turning of the tapping screw with respect to the workpiece 2. However, as is apparent from FIG. 2, with a small mounting hole 3 the grommet is likely to rotate with the turning of a tapping screw when the difference in the length (a) on one side of the mounting hole 3 and the diagonal length (b) of the shank 5 is small. If the tapping screw is not adequately secured in the grommet because of the rotating grommet, the joining force between the member 10 and the workpiece 2 is inadequate.

The screw grommet disclosed in Unexamined Utility Model Application Publication No. 49-25957 has a rectangular cross-section suitable for a rectangular mounting hole in a workpiece. Axial slits are formed in the shank in positions corresponding to the center of the sides of the rectangular cross-section so that the turning tapping screw widens the flange and the shank in a direction perpendicular to the axial direction. However, the slits extend almost the entire axial length of the shank, which reduces the strength of the shank. When a tapping screw is screwed in, there is insufficient resistance to the fastening torque, so the tapping screw cannot be secured properly, and the joining force is not high.

The screw grommet disclosed in Unexamined Utility Model Application Publication No. 55-124618 has engaging sections on the shank adjacent to the flange on the underside of the workpiece, but the shank does not widen when the tapping screw is turned in. As a result, the grommet is likely to rotate with the tapping screw.

The screw grommet disclosed in Unexamined Utility Model Application Publication No. 7-10572 has a shank with a rectangular cross-section and full-length axial slits in the shank corresponding to the corners of the rectangular cross-section. Engaging sections are arranged adjacent to the flange at the middle of respective sides of the rectangular cross-section of the shank. The shank widens when the tapping screw is screwed in, but because the shank in this screw grommet is divided into four sections by slits extending the entire length of the shank, there is insufficient resistance to the fastening torque when the tapping screw is screwed in, and the tapping screw cannot be secured properly.

BRIEF DESCRIPTION OF THE INVENTION

An object of the present invention is to provide a screw grommet that does not rotate when a tapping screw is turned therein and that is able to provide high retention force with respect to a workpiece.

In a preferred embodiment, the present invention provides a screw grommet comprising a rectangular cross-section shank to be inserted into a rectangular cross-section mounting hole in a workpiec and a flange formed at one end of the shank that is larger than the mounting hole in the workpiece. An axial cavity is formed in the flange and the shank into which a tapping screw can be screwed. The cavity terminates before reaching the tip of the shank remote from the flange. Both the flange and a portion of the shank are divided by a plurality of axial slits, so as to widen in a direction perpendicular to the axial direction of the shank when the tapping screw is screwed into the cavity. Engaging sections (protrusions) are formed on the outer periphery of the shank separated axially from the flange by about the thickness of the workpiece, and the engaging sections are arranged diagonally to one another in the rectangular cross-section of the shank.

The screw grommet of the present invention maintains the strength of the shank and prevents the shank from turning when a tapping screw is screwed in. The turning tapping screw expands the slitted portion of the shank outwardly in the radial direction inside the mounting hole in the workpiece. In this way, an outer surface of the shank frictionally engages the wall of the mounting hole, keeping the screw grommet from turning with the tapping screw, even when the size of the mounting hole is small. The turning tapping screw causes the engaging sections to engage diagonally on the undersurface of the workpiece to effectively secure the grommet. The diagonal length is greater than the length of one side of the rectangular cross-section, which further prevents rotation of the grommet with the screw.

In a preferred embodiment of this screw grommet, the axial slits are formed in positions corresponding to the center of the sides of the rectangular cross-section, and the engaging sections have an L-shaped cross-section embracing corresponding corners of the rectangular cross-section of the shank. Because the area of engagement between an engaging section and the workpiece is greater than that provided by an engaging section formed in the center of one side, the retention force is higher and the workpiece does not become deformed. In this screw grommet, the slits extend along only a portion of the cavity of the shank. The section of the cavity extending axially without slits toward the tip of the shank has a length able to accommodate at least one pitch length of the screwed in tapping screw. This secures the tapping screw firmly to the screw grommet, and keeps the tapping screw secured to the screw grommet even when the mounted member sustains a strong turning force. It also resists a strong force sustained in the direction of the mounted member.

BRIEF DESCRIPTION OF THE DRAWINGS

The invention will be further described in conjunction with the accompanying drawings, which illustrate a preferred (best mode) embodiment, and wherein:

FIG. 9 (A) is a cross-sectional view of the screw grommet in FIG. 8 from line IX—IX before the screw is screwed in.

FIG. 9 (B) is a cross-sectional view of the screw grommet in FIG. 8 from line IX—IX after the screw is screwed in.

DETAILED DESCRIPTION OF THE INVENTION

Figure 8:
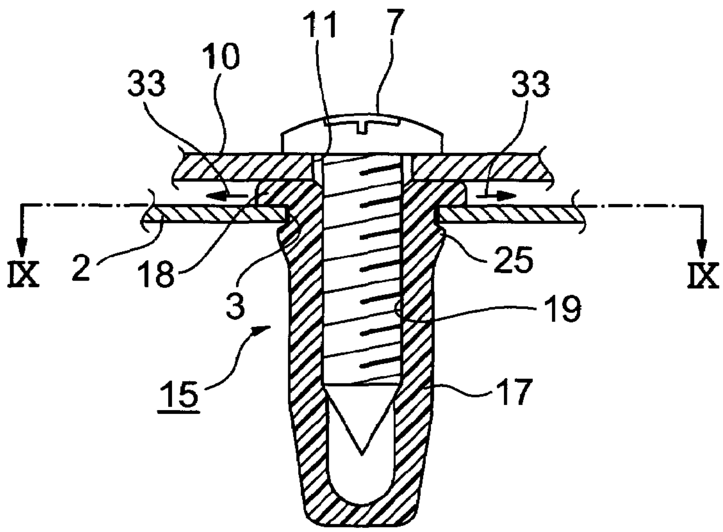
FIG. 8 is a cross-sectional view of the screw grommet of the present invention in FIG. 3 from line VIII—VIII in FIG. 5, used to mount a member on a workpiece with a tapping screw.
Figure 9:
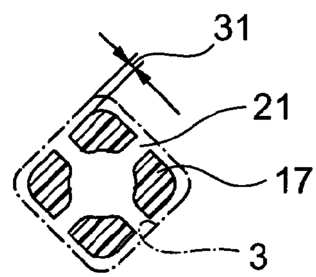
Figure 9:
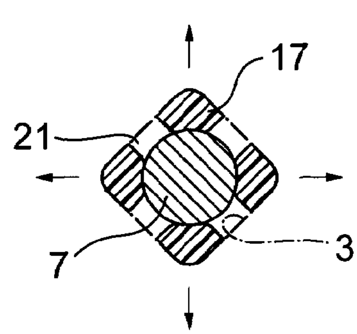

A screw grommet 15 of a preferred embodiment of the present invention is shown in FIGS. 3 to 7(A). FIGS. 8, 9(A) and 9(B) show a member 10 joined to a workpiece 2 using the screw grommet 15.

The screw grommet 15, which is preferably made entirely of plastic, comprises a shank 17 inserted into a mounting hole 3 in a workpiece 2 and a flange 18 formed at one end of the shank 17 that is larger than the mounting hole in the workpiece 2. A cavity 19 is formed in the shank 17 and the flange 18 into which a tapping screw 7 can be screwed (see FIG. 6). The shank 17 has a rectangular cross-section appropriate for a rectangular mounting hole in the workpiece 2. The rectangular cross-section of the shank is similar to the rectangular cross-section of the mounting hole, and the size is the same or slightly smaller, so the shank can be inserted into the mounting hole with the application of a small amount of pressure. The flange 18 has a rectangular shape similar to the rectangular cross-section of the shank 17 and is integral with the shank. The flange 18 should be large enough to keep from entering the mounting hole in the workpiece 2 when the shank 17 is inserted in the mounting hole and the flange abuts the workpiece.

The flange 18 and a section of the shank 17 are provided with a plurality of slits 21 that extend axially from the flange by a distance that is substantially less than the length of the shank. Because the slits 21 extend only along a portion of the length of the shank 17, the strength of the shank is maintained, but still the shank does not turn when the tapping screw is screwed in. The slits 21 allow the flange 18 and shank 17 to expand in a direction perpendicular to the axial direction (outward radially) when the tapping screw 7 is screwed into the cavity 19. Therefore, a section of the shank expands outward radially in the mounting hole of the workpiece, and the outer surface of this section of the shank strongly engages the wall of the mounting hole. The slits 21 also make the section of the shank 17 near the flange 18 flexible inwardly in the radial direction. This allows the section of the shank near the flange 18 where the engaging sections 25 (described below) are formed to pass through the mounting hole in the workpiece. By flexing inward radially, the shank 17 can be inserted into the mounting hole in the workpiece easily.

Figure 6:
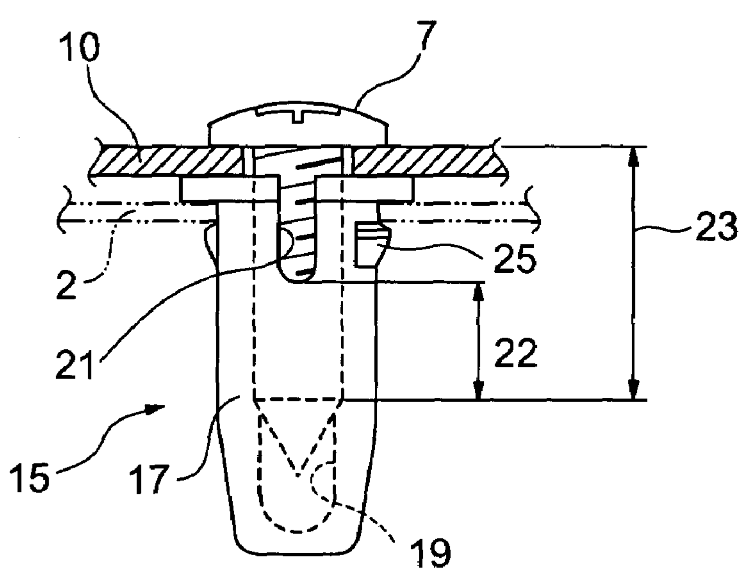
FIG. 6 is a partly sectional side view used to explain the length of the slits and the length of the cavity in the screw grommet in FIG. 3.
Figure 7:
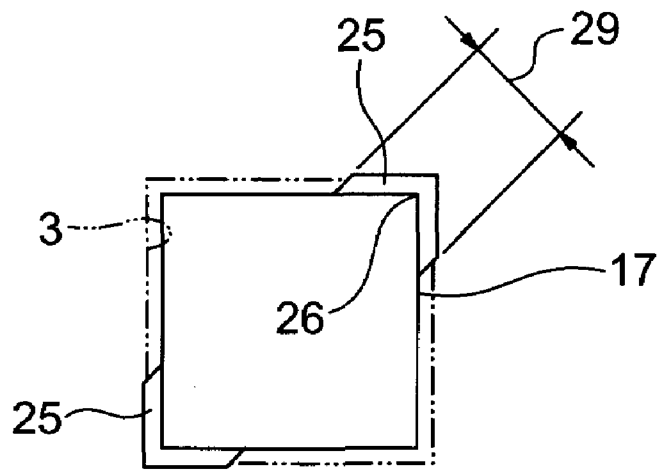
FIG. 7(A) is a cross-sectional view of the shank in a screw grommet of the present invention showing the engaging sections on the shank formed diagonally on the rectangular periphery.
FIG. 7(B) is a cross-sectional view of the shank in a screw grommet showing engaging sections on the shank formed in the center of opposite sides of the rectangular periphery.
Figure 7:
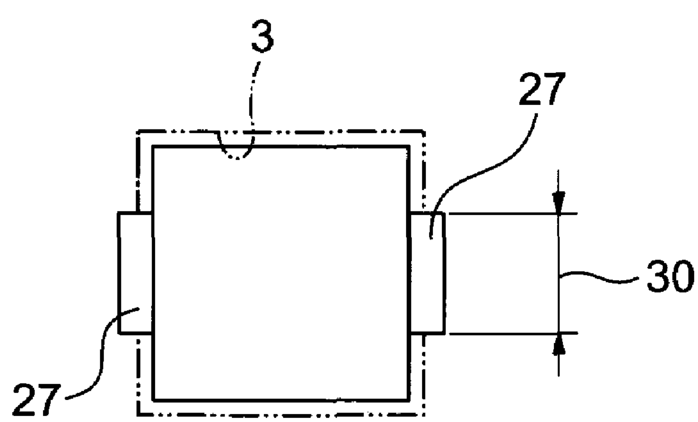

Four slits 21 are formed in positions corresponding to the center of the sides of the rectangular cross-section of the shank 17. The cavity 19 extends axially towards the tip of the shank 17 (the bottom end in FIG. 3, FIG. 5 and FIG. 6) where there are no slits, but terminates short of the tip of the shank. Referring to FIG. 6, a section 22 of the cavity 19 without any slits is long enough for at least one pitch length of the screw in the effective screwing range 23 of the tapping screw. The portion of the cavity 19 that is slitted extends approximately midway of the part of the cavity that is engaged by the threads of the tapping screw 7 (i.e., to about the middle of the screwing range 23 of the tapping screw). The section 22 of the cavity without any slits, that is engaged by the threads of the tapping screw 7, is preferably about half the length of the shank of the tapping screw and is able to secure the tapping screw 7 in the shank 17 of the screw grommet. The screw grommet is able to hold the tapping screw even when a strong turning force is applied to the workpiece. It is also able to resist a strong force from the workpiece and keeps a member 10 attached to the workpiece.

Figure 1:
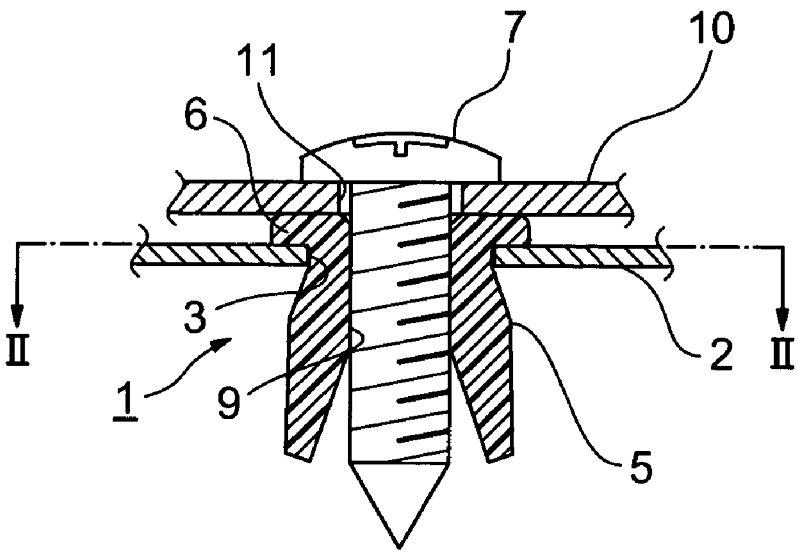
FIG. 1 is a cross-sectional view of a screw grommet of the prior art used to mount a member on a workpiece with a tapping screw.
Figure 2:
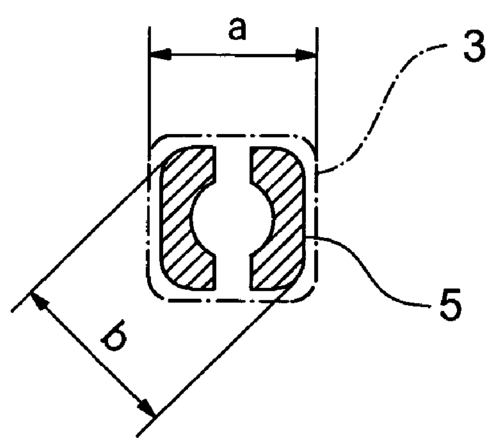
FIG. 2 is a cross-sectional view of the screw grommet in FIG. 1 from line II—II.
Figure 3:
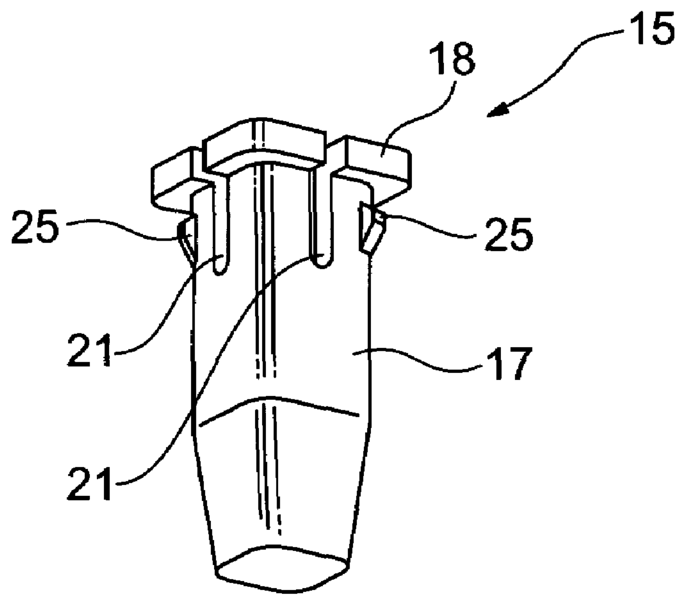
FIG. 3 is a perspective view of a screw grommet in accordance with the present invention.
Figure 4:
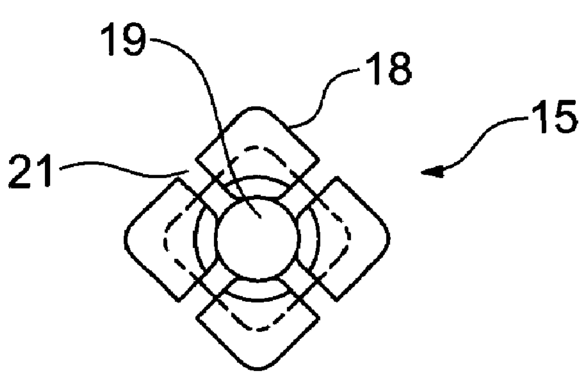
FIG. 4 is a top plan view of the screw grommet in FIG. 3.
Figure 5:
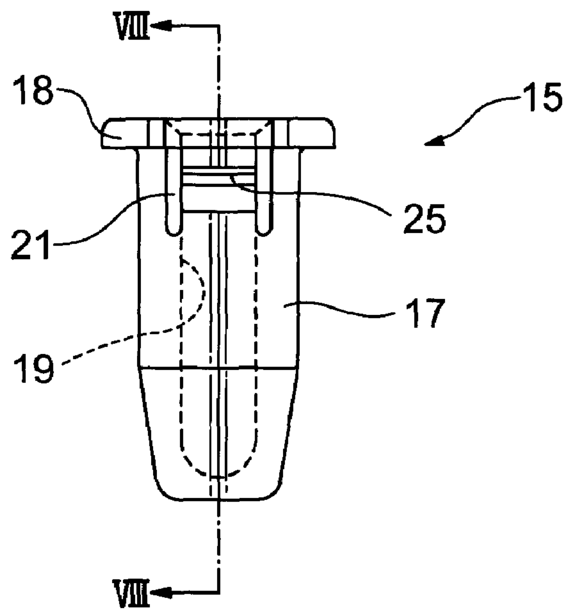
FIG. 5 is a side view of the screw grommet in FIG. 3.

In the embodiment shown in FIGS. 3–7(A), 8, 9(A) and 9(B), engaging sections (protrusions) 25 are formed on the outer surface of the shank 17 in positions separated axially from the flange 18 by about the thickness of the workpiece 2 and arranged diagonally to one another with respect to the rectangular cross-section. As shown in FIGS. 3 and 6, the engaging sections 25 have inclined surfaces facing toward the flange 18 and toward the end of the shank 17 (bottom end). A mid-surface of the engaging sections protrudes outward radially. The inclined surface of the engaging sections 25 near the flange 18 is at a nearly 90° angle with respect to the outer surface of the shank so as to form an engaging shoulder for the workpiece. The inclined surface facing toward the tip of the shank approaches the outer surface of the shank in a direction toward the tip of the shank, and at a gentle angle with respect to the outer surface of the shank, so as to allow the shank to be easily inserted into the mounting hole.

As shown in FIG. 7(A), engaging sections 25 have an L-shaped cross-section embracing diagonally disposed corners of the rectangular cross-section of the shank 17. Referring to FIGS. 7(A) and 7(B), if the dimension 29 of each engaging section 25 in FIG. 7(A) is "A", and is the same as the dimension 30 of each engaging section 27 at the center of a side of the rectangular cross-section, as shown in FIG. 7(B), then the L-shaped length of an engaging section 25 in FIG. 7(A) is $\sqrt{2}\cdot A$, i.e., greater than the length A of an engaging section 27 in FIG. 7(B). This increases the retention force. Also, engaging sections at the corners of the mounting hole 3 distribute the supporting force in two orthogonal directions, so the supporting force is stronger and deformation is less likely. In this example, there is a single pair of engaging sections 25 arranged diagonally with respect to one another in the rectangular cross-section.

Normally, a pair of engaging sections is sufficient because of the high retention strength. However, if even more retention strength is required, another pair of engaging sections 25 can be arranged diagonally with respect to one another at the other corners in the rectangular cross-section.

A member 10 attached to a workpiece 2 using one of the screw grommets 15 and a tapping screw 7 is shown in FIG. 8. FIG. 9(A) is a cross-sectional view from line IX—IX in FIG. 8 showing the shank 17 of the screw grommet 15 inserted into the mounting hole 3 in the workpiece 2 before the tapping screw 7 has been screwed in. FIG. 9(B) is a cross-sectional view from line IX—IX in FIG. 8 showing the shank 17 of the screw grommet 15 inserted into the mounting hole 3 in the workpiece 2 aft r the tapping screw 7 has been screwed in. If there is a gap 31 between the shank 17 and the mounting hole 3 in the workpiece 2, the screw grommet 15 can be installed in the workpiece 2 using less force. The gap 31 shown here is not essential and can be eliminated.

To install the screw grommet 15, a worker inserts the shank 17 into a mounting hole 3 in a workpiece 2, such as an automobile body panel, until the flange 18 comes into contact with the workpiece 2. The engaging sections 25 in the shank 17 are bent inward radially inside the mounting hole 3, and then extend out at the underside of the workpiece 2 where they engage the edge of the mounting hole 3.

Next, the worker aligns the mounting hole 11 of a member 10, such as a component or bracket, with the cavity 19 in the flange 18, inserts a tapping screw 7 into the mounting hole 11 in the member 10, and screws the tapping screw into the cavity 19 of the screw grommet 15. The screwing action expands the slitted section of the shank 17 inside the mounting hole 3 of the workpiece 2 outward radially as indicated by the arrows in FIG. 9(B), and the outer surface of the shank securely engages the wall of the mounting hole 3. The rectangular cross-section of the shank engages the rectangular cross-section of the mounting hole properly, and the outer surface of the slitted shank section frictionally engages the wall of the mounting hole, keeping the screw grommet from turning with the tapping screw even when the size of the mounting hole is small.

The turning tapping screw 7 causes the engaging sections 25 to engage diagonally on the undersurface of the workpiece, as indicated by the arrows 33 in FIG. 8, to effectively secure the screw grommet 15 to the workpiece 2 and further improve the anti-turning function. Because the axial slits 21 extend only along a portion of the axial length of the shank 17, the strength of the shank 17 is maintained, and the shank does not turn with the tapping screw. Because the section of the cavity without slits extends axially toward the tip of the shank and has a length able to accommodate at least one pitch length of the screwed in tapping screw, the tapping screw 7 is secured firmly to the screw grommet 15, and the tapping screw 7 remains secured to the screw grommet 15 even when the mounted member 10 sustains a strong turning force. It also resists a strong force sustained in the direction of the mounted member.

The screw grommet of the present invention maintains the strength of the shank and prevents the shank from turning when a tapping screw is screwed in. The turning tapping screw expands a slitted shank section outwardly in the radial direction inside the mounting hole in the workpiece to securely engage the wall of the mounting hole, keeping the screw grommet from turning with the tapping screw even when the size of the mounting hole is small. The turning tapping screw causes the engaging sections to engage diagonally on the undersurface of the workpiece to effectively secure the grommet. Because the engaging area is wide and the retention force is high, the anti-turning function is further strengthened.

While a preferred embodiment of the invention has been shown and described, it will be apparent that changes can be made without departing from the principles and spirit of the invention, the scope of which is defined in the accompanying claims.

What is claimed is:

1. A combination of a screw grommet and an associated tapping screw, wherein the screw grommet comprises a shank to be inserted into a mounting hole in a workpiece and a flange formed at one end of the shank that is larger than the mounting hole in the workpiece, wherein a cavity is formed in the flange and the shank into which the tapping screw can be screwed to join a mounted member to the workpiece, wherein the shank has a rectangular cross-section appropriate for a rectangular cross-section mounting hole in the workpiece, wherein both the flange, and a section of the shank that extends from the flange a distance that is substantially less than the length of the shank, are divided by a plurality of axial slits that extend completely through the flanged the shank, to allow a section of the shank to widen in a direction perpendicular to the axial direction of the shank by screwing the tapping screw into the cavity, wherein protrusions project from outer peripheral surfaces of the shank separated axially from the flange by about the thickness of the workpiece, wherein the protrusions are arranged diagonally to one another in the rectangular cross-section of the shank, wherein the axial slits are formed in positions corresponding to the center of all sides of the periphery of the rectangular cross-section of the flange and the shank and are spaced from the protrusions so that there are portions of the shank between the slits and the protrusions, wherein the protrusions have an L-shaped cross-section embracing corresponding corners of the rectangular cross-section of the shank , wherein the slits terminate at about the middle of the axial length of a portion of the cavity engaged by threads of the screw, and wherein a section of the cavity extending axially without slits toward the tip of the shank has a length able to accommodate at least one pitch length of the screwed in tapping screw.

2. A screw grommet having a shank and a flange at one end of the shank, the flange and the shank having a cavity extending axially of the screw grommet and the flange and the shank being divided by a plurality of slits that extend completely through the flanged the shank and that extend axially of the screw grommet along only a portion of the axial length of the cavity, wherein the flange and the shank have rectangular cross-sections and the slits centrally divide all sides of the rectangular cross-section of the flange and the shank, and wherein the shank has a plurality of protrusions projecting from outer peripheral surfaces of the shank at positions spaced from the flange and from the slits so that there are portions of the shank between the slits and the protrusions.

3. A screw grommet according to claim 2, wherein the protrusions embrace corresponding corners of the rectangular cross-section of the shank.

4. A screw grommet according to claim 3, wherein the protrusions are disposed at opposite corners of the rectangular cross-section of the shank.

5. A screw grommet according to claim 2, wherein each of the protrusions has a shoulder facing the flange and has an inclined surface that approaches an outer surface of the shank in a direction toward a tip of the shank remote from the flange.

6. A combination of a screw grommet according to claim 2 and an associated tapping screw, wherein the associated tapping screw is dimensioned to be screwed into the cavity through the flange, and wherein the slits extend over an axial length of the shank that is about half the axial length of threads of the screw.

* * * * *